(12) United States Patent
Chiang et al.

(10) Patent No.: US 10,207,370 B2
(45) Date of Patent: Feb. 19, 2019

(54) METHOD OF MANUFACTURING METAL BASKET

(71) Applicant: Shen Hao Metal Working Co., LTD., Yilan, Yilan County (TW)

(72) Inventors: A-Ming Chiang, Yilan (TW); Wei-Ching Chiang, Yilan (TW)

(73) Assignee: Shen Hao Metal Working Co., Ltd., Yilan (TW)

( * ) Notice: Subject to any disclaimer, the term of this patent is extended or adjusted under 35 U.S.C. 154(b) by 137 days.

(21) Appl. No.: 15/375,417

(22) Filed: Dec. 12, 2016

(65) Prior Publication Data

US 2018/0161940 A1 Jun. 14, 2018

(51) Int. Cl.

| B23K 31/02 | (2006.01) |
|---|---|
| B21F 27/10 | (2006.01) |
| B23K 37/00 | (2006.01) |
| B21F 45/00 | (2006.01) |
| B65D 6/08 | (2006.01) |
| B21F 27/14 | (2006.01) |
| B23K 101/32 | (2006.01) |

(52) U.S. Cl.
CPC .............. *B23K 31/02* (2013.01); *B21F 27/10* (2013.01); *B21F 27/14* (2013.01); *B21F 45/00* (2013.01); *B23K 37/00* (2013.01); *B65D 7/20* (2013.01); *B23K 2101/32* (2018.08)

(58) Field of Classification Search
CPC ....................................................... B65D 7/20
See application file for complete search history.

(56) References Cited

U.S. PATENT DOCUMENTS

| 3,752,352 A * | 8/1973 | Senecal ..................... B65D 7/20 |
| | | 206/506 |
| 3,776,410 A * | 12/1973 | Carlson ..................... B65D 7/20 |
| | | 206/459.5 |
| 4,254,944 A * | 3/1981 | von Matern ............ B21F 27/12 |
| | | 228/184 |
| 5,769,435 A * | 6/1998 | Nishida ..................... B62B 3/14 |
| | | 280/33.991 |
| 5,921,513 A * | 7/1999 | Skvorecz ............. B65D 21/046 |
| | | 126/40 |

(Continued)

FOREIGN PATENT DOCUMENTS

| EP | 0127798 A2 * | 12/1984 | .............. B21F 27/12 |
| EP | 0703023 A1 * | 3/1996 | .............. B21F 27/12 |

*Primary Examiner* — Devang R Patel
(74) *Attorney, Agent, or Firm* — Alan D. Kamrath; Kamrath IP Lawfirm, P.A.

(57) ABSTRACT

A method of manufacturing a metal basket contains the steps of preparing materials, initial welding, bending, and finish welding. In a step of preparing materials, multiple first metal bars, multiple second metal bars, and at least two peripheral bars are provided. In a step of initial welding, the multiple first metal bars and the multiple second metal bars are stacked crisscross and are welded together to produce a grid frame which has a base and multiple surrounding grids, and the at least two peripheral bars are welded with the multiple surrounding grids respectively. In a step of bending, the grid frame and the multiple surrounding grids are bent, such that the multiple surrounding grids are bent upwardly and are perpendicular to the base. In a step of finish welding, the at least two peripheral bars are welded together.

4 Claims, 9 Drawing Sheets

(56) References Cited

U.S. PATENT DOCUMENTS

| | | | |
|---|---|---|---|
| 6,926,328 B2* | 8/2005 | Hellerson | A63B 47/02 294/19.2 |
| 2013/0313211 A1* | 11/2013 | Skvorecz | B65D 7/20 211/85.31 |
| 2014/0060340 A1* | 3/2014 | Matos | A47J 37/1295 99/416 |

* cited by examiner

METHOD OF MANUFACTURING METAL BASKET

BACKGROUND OF THE INVENTION

Field of the Invention

The present invention relates to a method of manufacturing a basket and, more particularly, to a method of manufacturing a metal basket which contains steps of welding and bending by way of metal bars.

Description of the Prior Art

A conventional basket is configured to accommodate objects and is fixed on a kitchen, a bathroom or a storage room. The conventional basket is a plastic basket or a metal basket. The plastic basket is light-weight and cheap, but it is not strong enough to hold the objects securely. However, the metal basket is rigid enough to hold the objects firmly and has an outstanding appearance.

As illustrated in FIGS. 1 and 2, a conventional metal basket contains multiple first metal bars 101 and multiple second metal bars 102 which are stacked crisscross and are welded together to form a grid frame which has a base 103, two first surrounding sheets 104 and two second surrounding sheets 105 which connect with a rim of the base 103. The grid frame is bent by using a stamping machine in a step of bending, such that the multiple first surrounding sheets 104 and the multiple second surrounding sheets 105 are bent upwardly and perpendicular to the base 103 to form a body 10 with an opening facing upwardly. A holder 20 is bent from a metal rod and is fitted with the opening of the body 10, and the multiple first metal bars 101 and the multiple metal bars 102 are welded together to produce the metal basket.

After welding the holder 20 and the body 10 together, two movable connectors 30 are welded on the holder 20, so that the metal basket is pulled outwardly and is retracted inwardly along a drawer by using the two movable connectors 30 and two slide rails of the drawer.

Nevertheless, the multiple first metal bars 101 and the multiple second metal bars 102 are stacked crisscross and are welded together to form the body 10, and the holder 20 is bent from the metal rod and is fitted with the opening of the body 10. The multiple first metal bars 101 and the multiple metal bars 102 of the body 10 are welded together, thus producing the metal basket complicatedly and having a high production cost.

The present invention has arisen to mitigate and/or obviate the afore-described disadvantages.

SUMMARY OF THE INVENTION

The primary objective of the present invention is to provide a method of manufacturing a metal basket which contains multiple first metal bars and multiple second metal bars stacked crisscross and welded together to form a body. When bending the body, the at least two peripheral bars are bent and welded to form a holder, thus simplifying the manufacturing process and reducing the production cost.

A method of manufacturing a metal basket provided by the present invention contains the steps of: preparing materials, initial welding, bending, and finish welding.

In a step of preparing materials, multiple first metal bars, multiple second metal bars, and at least two peripheral bars are provided.

In a step of initial welding, the multiple first metal bars and the multiple second metal bars are stacked crisscross and are welded together to produce a grid frame which has a base and multiple surrounding grids connecting with a rim of the base, When the multiple first metal bars and the multiple second metal bars are stacked crisscross and are welded together, the at least two peripheral bars are welded with the multiple surrounding grids respectively. Each of the at least two peripheral bars has two bending extensions extending from two ends of each peripheral bar and over two ends of each of the multiple surrounding grids respectively.

In a step of bending, the grid frame and the multiple surrounding grids are bent, such that the multiple surrounding grids of the grid frame are bent upwardly and are perpendicular to the base to form a body with an opening facing upwardly. The two bending extensions of each peripheral bar and the body are bent and are connected together to produce a holder.

In a step of finish welding, two bending extensions of each peripheral bar of the holder are welded together.

DETAILED DESCRIPTION OF THE PREFERRED EMBODIMENTS

Figure 1:
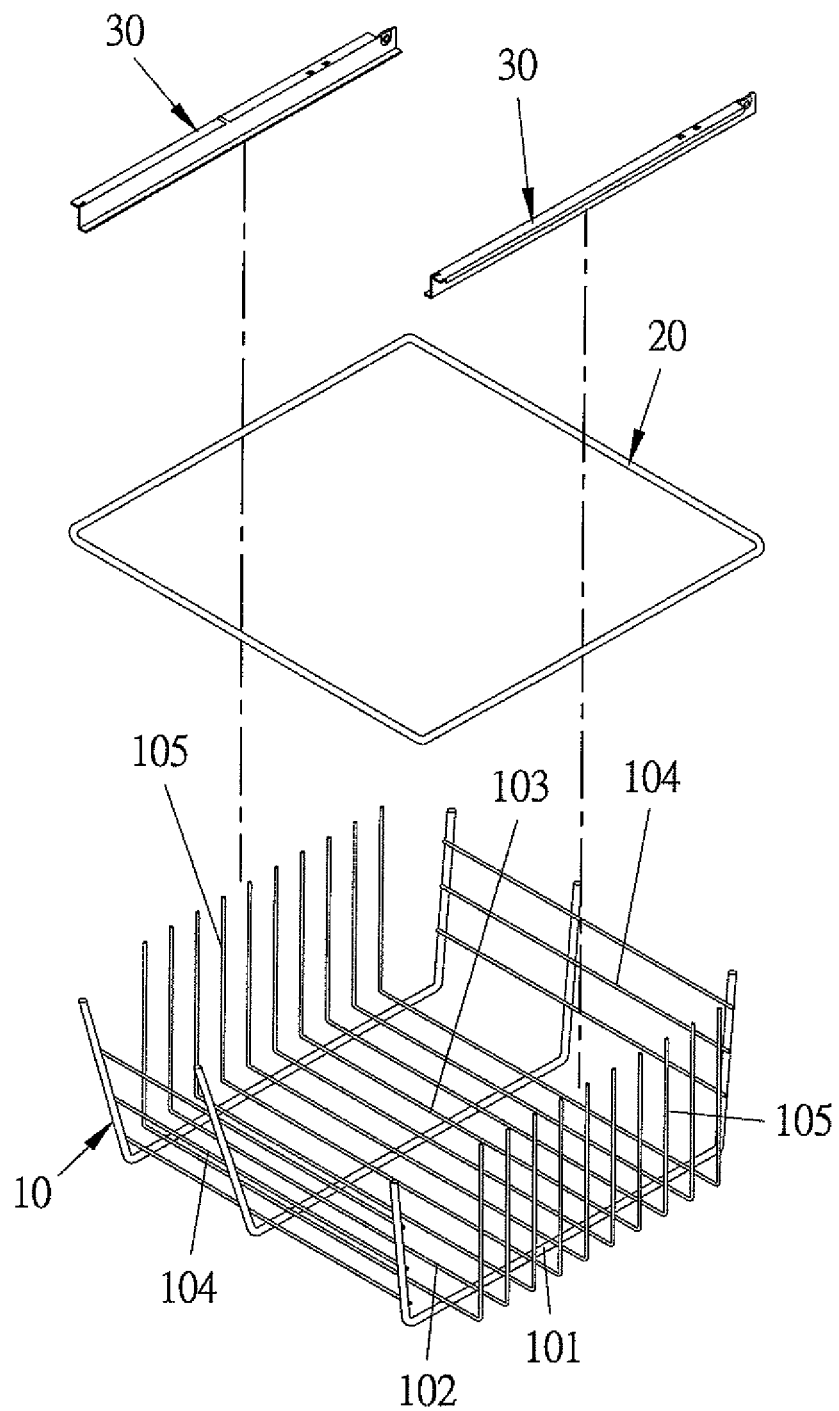
FIG. 1 is a perspective view showing the exploded components of a conventional metal basket.
Figure 2:
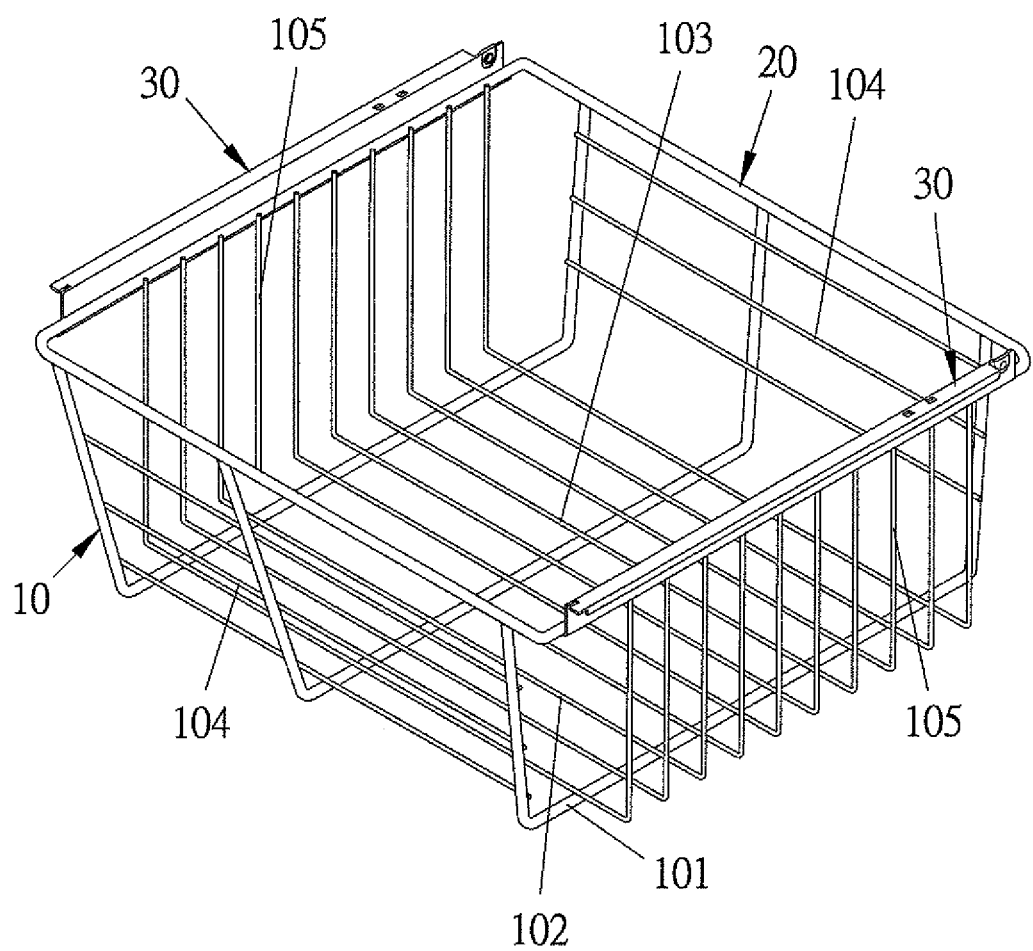
FIG. 2 is a perspective view showing the assembly of the conventional metal basket.
Figure 3:
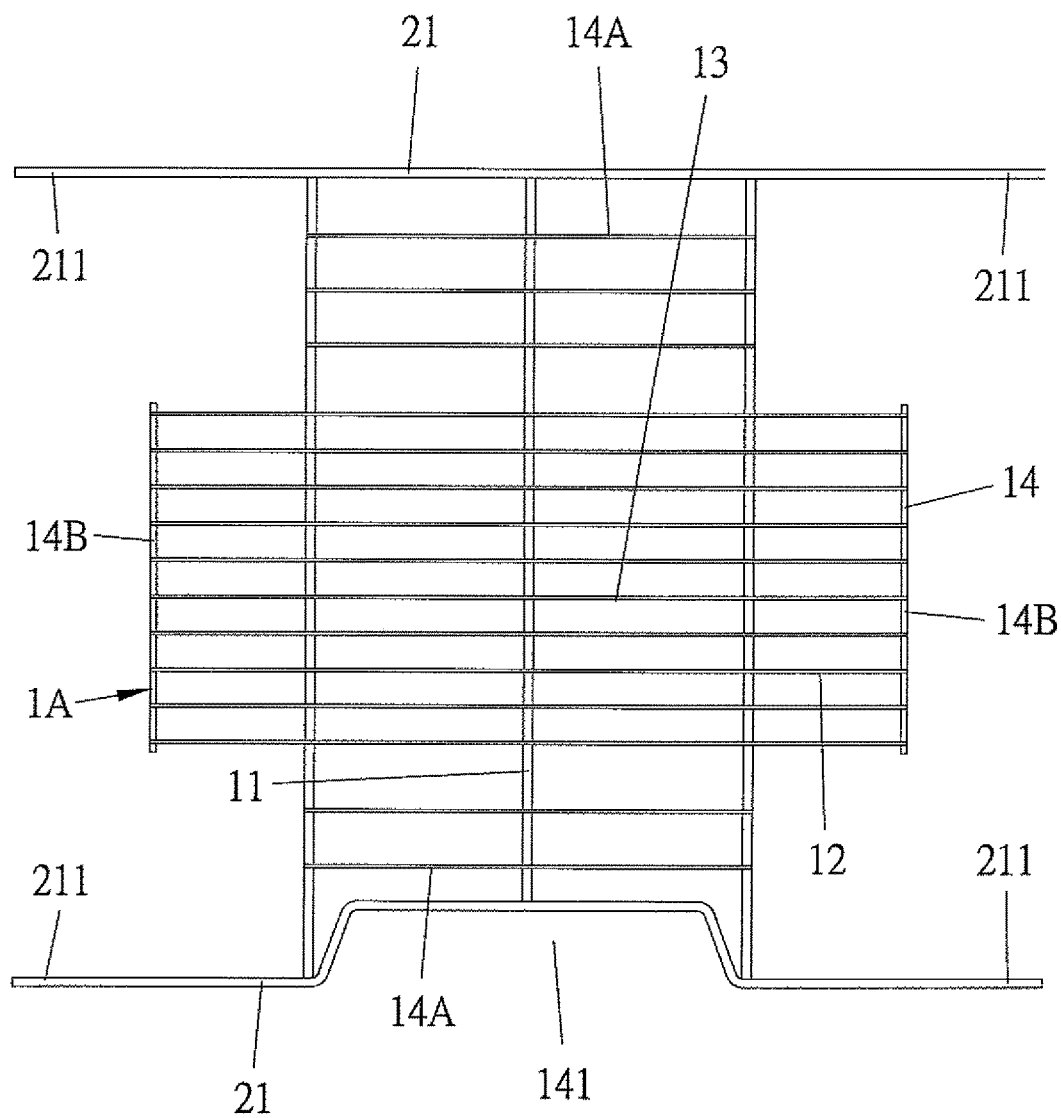
FIG. 3 is a side plane view showing the assembly of a metal basket manufactured in a step of initial welding in accordance with a first embodiment of the present invention.
Figure 4:
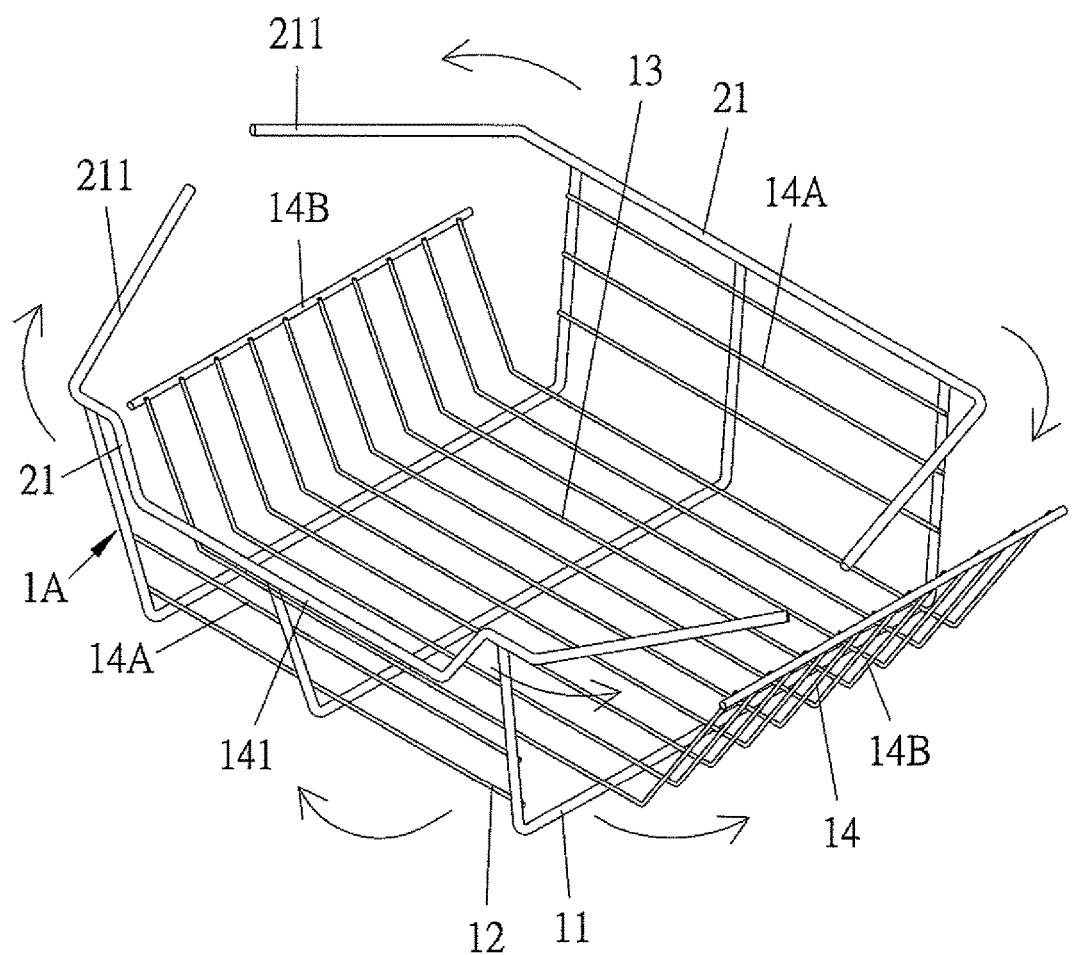
FIG. 4 is a perspective view showing the metal basket being bent in accordance with the first embodiment of the present invention.
Figure 5:
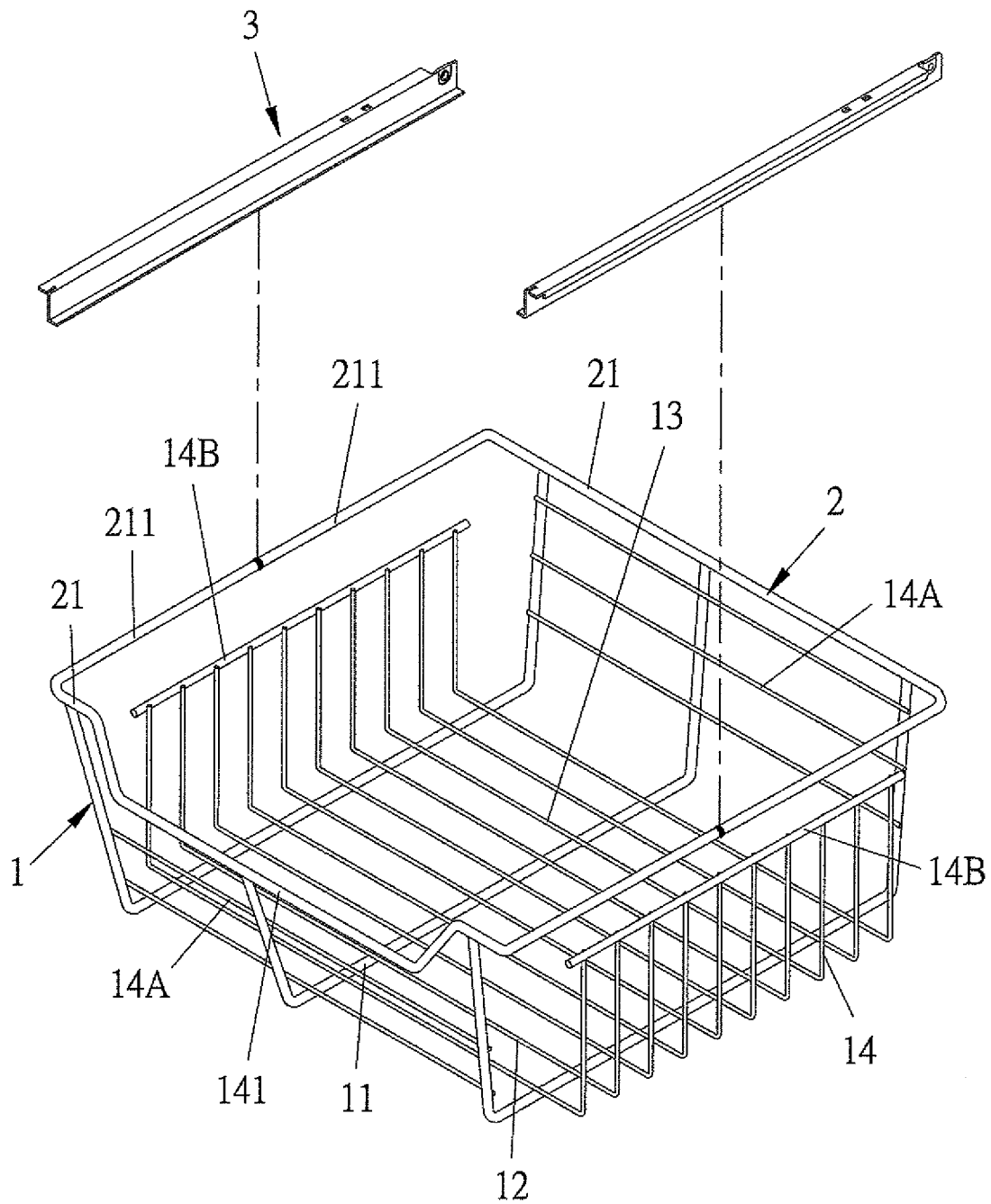
FIG. 5 is a perspective view showing two movable connectors being welded on a holder in accordance with the first embodiment of the present invention.
Figure 6:
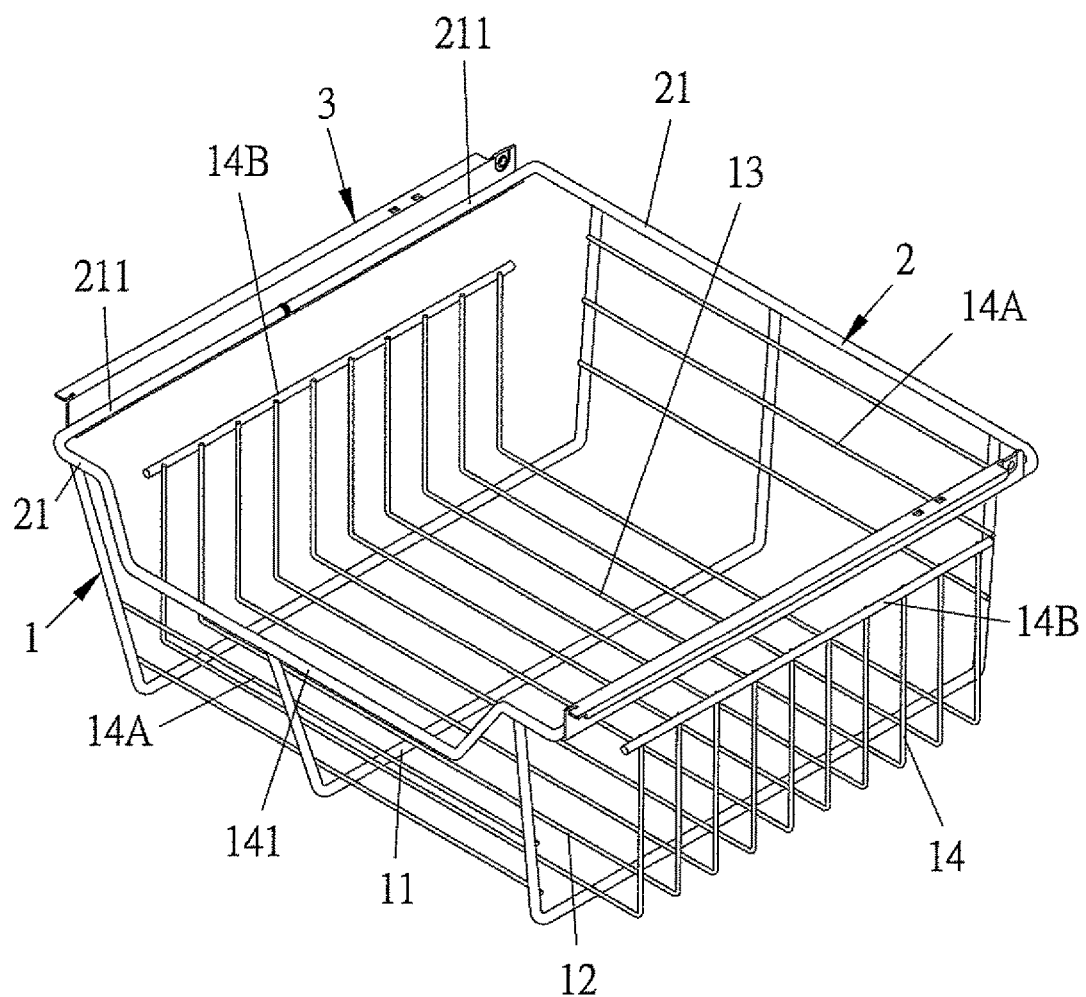
FIG. 6 is a perspective view showing the assembly of the metal basket in accordance with the first embodiment of the present invention.

The present invention will be clearer from the following description when viewed together with the accompanying drawings, which show, for purpose of illustration only, the preferred embodiments in accordance with the present invention.

Referring to FIGS. 3-6, a method of manufacturing a metal basket according to a first embodiment of the present invention comprises the steps of: preparing materials, initial welding, bending, and finish welding.

In a step of preparing materials, multiple first metal bars 11, multiple second metal bars 12, at least two peripheral bars 21, and two movable connectors 3 are provided. A length of each of the multiple first metal bars 11 is not equal to that of each of the multiple second metal bars 12.

In a step of initial welding, the multiple first metal bars 11 and the multiple second metal bars 12 are stacked crisscross and are welded together by way of an electric welding machine to produce a grid frame 1A which has a base 13 and multiple surrounding grids 14 connecting with a rim of the base 13. In this embodiment, the multiple surrounding grids 14 are two opposite first parts 14A and two opposite second parts 14B. When the multiple first metal bars 11 and the multiple second metal bars 12 are stacked crisscross and are welded together, two peripheral bars 21 are welded with the two opposite first parts 14A respectively and are away from the rim of the base 13. Each of the two peripheral bars 21 has two bending extensions 211 extending from two ends of said each peripheral bar 21 and over two ends of each of the two opposite first parts 14A respectively. Furthermore, at least one of the multiple surrounding grids 14 of a body 1 has a recess 141 away from the rim of the base 13, and one of the two peripheral bars 21 is bent to form the recess 141 on one of the two opposite first parts 14A.

In a step of bending, the grid frame 1A and the two peripheral bars 21 are bent by using a stamping machine, such that the two opposite first parts 14A and the two opposite second parts 14B of the grid frame 1A are bent upwardly and are perpendicular to the base 13 to form the body 1 with an opening facing upwardly. In addition, the two bending extensions 211 of each peripheral bar 21 and the body 1 are bent and are connected together to produce a holder 2.

In a step of finish welding, two bending extensions 211 of one of the two peripheral bars 21 of the holder 2 are welded with two bending extensions 211 of the other of the two peripheral bars 21 of the holder 2. The two movable connectors 3 are welded on the two bending extensions 211 of each peripheral bar 21 of the holder 2 to fix the two movable connectors 3 on two opposite sides of the holder 2, thus manufacturing the metal basket.

In use, the metal basket is pulled outwardly and is retracted inwardly along a drawer by using the two movable connectors 3 and two slide rails of the drawer.

Figure 7:
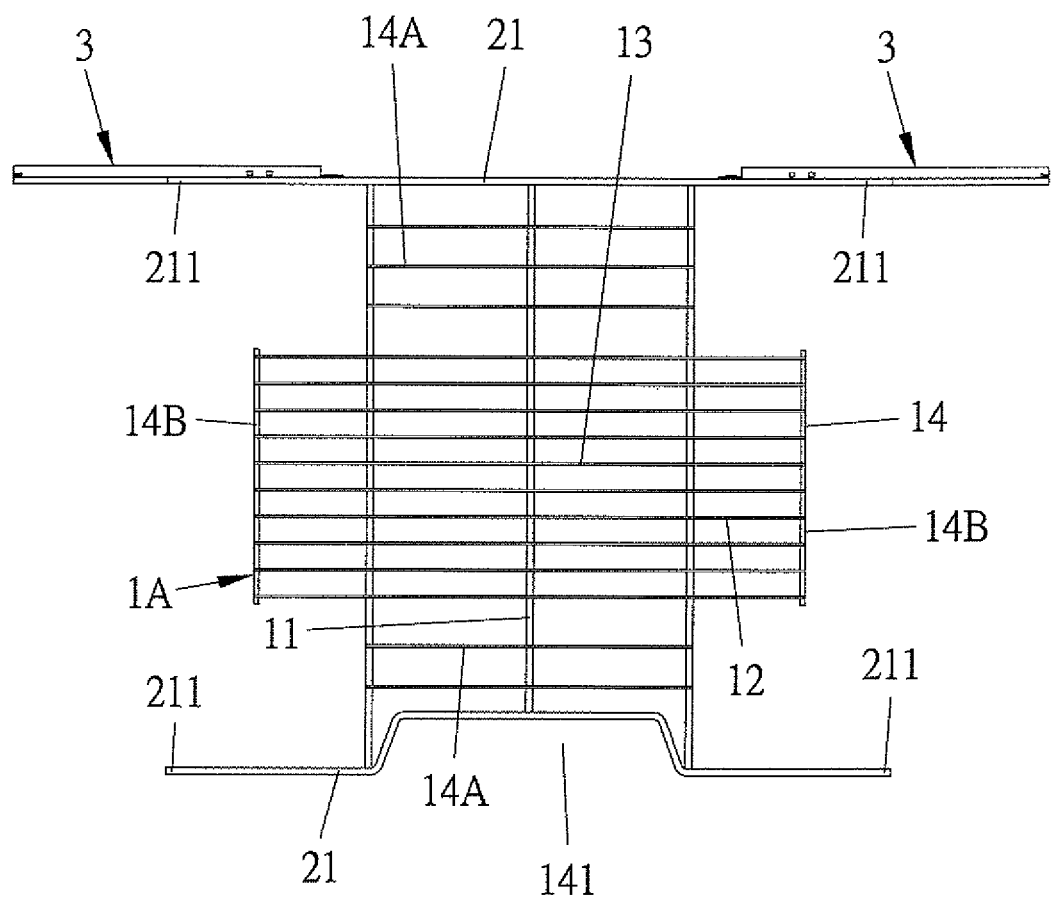
FIG. 7 is a side plane view showing a metal basket being welded in a step of initial welding in accordance with a second embodiment of the present invention.

Referring further to FIG. 7, in a second embodiment, the two movable connectors 3 are welded on one of the two bending extensions 211 of each peripheral bar 21 in the step of initial welding. The two movable connectors 3 are fixed opposite to each other on two bending extensions 211 of the two peripheral bars 21 in the step of bending.

Figure 8:
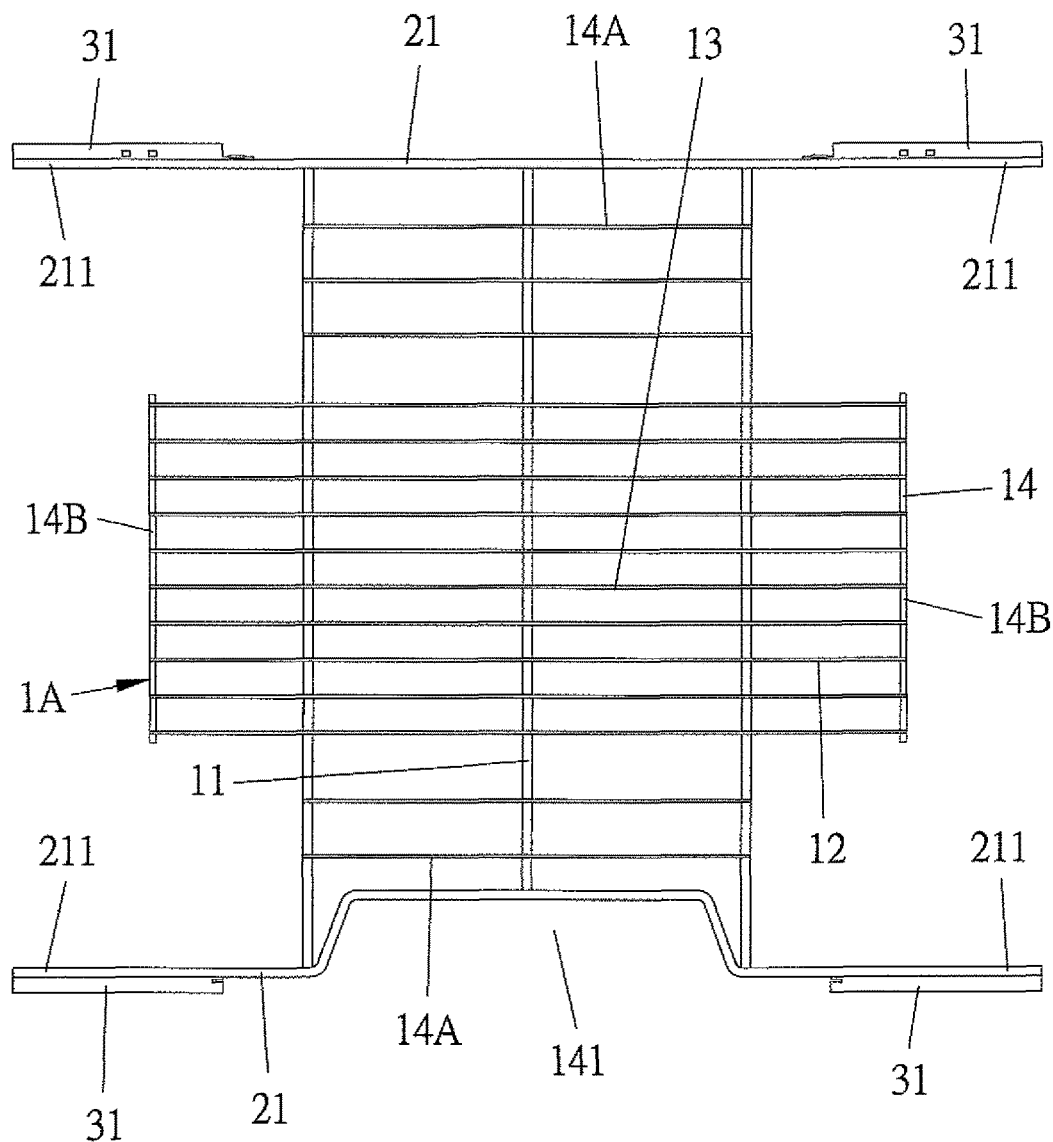
FIG. 8 is a side plane view showing a metal basket being welded in a step of initial welding in accordance with a third embodiment of the present invention.
Figure 9:
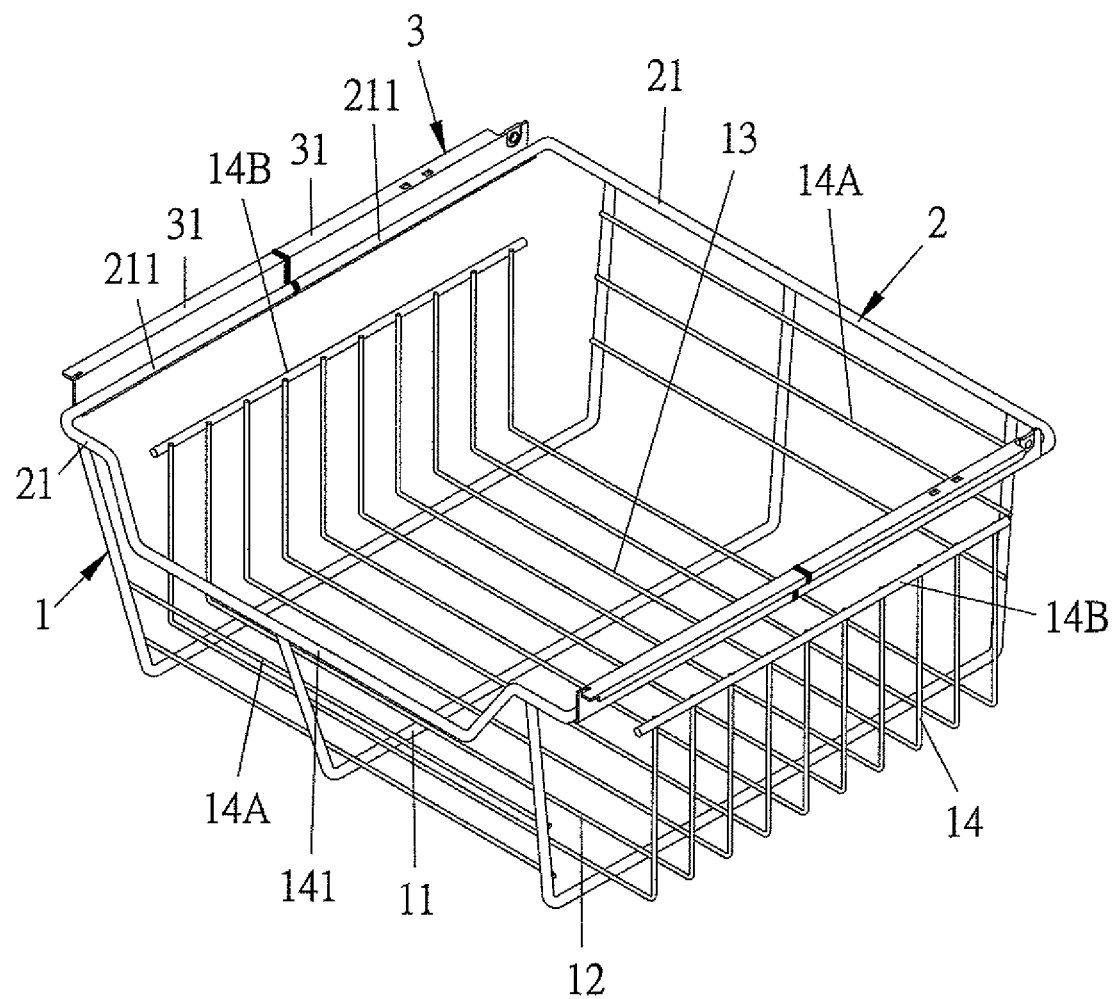
FIG. 9 is a perspective view showing the assembly of the metal basket in accordance with the third embodiment of the present invention.

As shown in FIGS. 8 and 9, in a step of preparing materials of a third embodiment, the multiple first metal bars 11, the multiple second metal bars 12, the two peripheral bars 21, and four connection pieces 31 are provided. A length of each of the multiple first metal bars 11 is not equal to that of each of the multiple second metal bars 12. In a step of initial welding, the four connection pieces 31 are welded on two bending extensions 211 of each of the two peripheral bars 21. In a step of bending, the four connection pieces 31, the grid frame 1A, and the two peripheral bars 21 are bent by using the stamping machine, such that the four connection pieces 31 form the two movable connectors 3 having a cutout when the two bending extensions 211 of each of the two peripheral bars 21 bend and connect together. In a step of finish welding, the cutout is welded to connect the two movable connectors 3.

Accordingly, the method of manufacturing the metal basket of the present invention has advantages as follows:

The multiple first metal bars 11 and the multiple second metal bars 12 are stacked crisscross and are welded together to form the body 1, and the at least two peripheral bars 21 are welded on the multiple surrounding grids 14 of the body 1 away from the rim of the base 13. When the multiple surrounding grids 14 of the body 1 are bent upwardly from the base 13, the at least two peripheral bars 21 are bent and connected to form the holder 2, thus simplifying the manufacturing process, reducing the production cost, and enhancing market competitiveness.

While various embodiments in accordance with the present invention have been shown and described, it is clear to those skilled in the art that further embodiments may be made without departing from the scope of the present invention.

What is claimed is:

1. A method of manufacturing a metal basket comprising:
a step of preparing materials, wherein multiple first metal bars, multiple second metal bars, four connection pieces, and at least two peripheral bars are provided;
a step of initial welding, wherein the multiple first metal bars and the multiple second metal bars are stacked crisscross and are welded together to produce a grid frame which has a base, wherein when the multiple first metal bars and the multiple second metal bars are stacked crisscross and are welded together, the at least two peripheral bars are welded with the base, wherein each of the at least two peripheral bars has two bending extensions extending from two ends of each peripheral bar, and wherein the four connection pieces are welded on the two bending extensions of each peripheral bar;
in a step of bending, wherein the grid frame is bent, such that part of the multiple first and second metal bars is bent upwardly and are perpendicular to the base to form a body with an opening facing upwardly, wherein the two bending extensions are connected together to produce a holder, and wherein the four connection pieces and the two bending extensions of each peripheral bar are bent so that any two adjacent of the four connection pieces has a cutout defined therebetween and form each of two movable connectors; and
in a step of finish welding, wherein the two bending extensions of each peripheral bar of the holder are welded together, and wherein the cutout between any two adjacent connection pieces is welded to connect the any two adjacent connection pieces together.

2. The method of manufacturing the metal basket as claimed in claim 1, wherein the at least two peripheral bars are welded to at least one of the multiple first metal bars and are away from a rim of the base.

3. The method of manufacturing the metal basket as claimed in claim 1, wherein in the step of finish welding, the two movable connectors are welded on the two bending extensions of each peripheral bar of the holder to fix the two movable connectors on two opposite sides of the holder.

4. The method of manufacturing the metal basket as claimed in claim 1, wherein in the step of initial welding, the two movable connectors are welded on one of the two bending extensions of each peripheral bar, and in the step of bending, the two movable connectors are fixed opposite to each other on the two bending extensions of the at least two peripheral bars.

* * * * *